(12) United States Patent
Wang et al.

(10) Patent No.: US 11,313,814 B2
(45) Date of Patent: Apr. 26, 2022

(54) DETECTION SCHEME FOR X-RAY SMALL ANGLE SCATTERING

(71) Applicant: RENSSELAER POLYTECHNIC INSTITUTE, Troy, NY (US)

(72) Inventors: Ge Wang, Loudonville, NY (US); Guang Li, Troy, NY (US); Wenxiang Cong, Albany, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

(21) Appl. No.: 16/955,939

(22) PCT Filed: Dec. 20, 2018

(86) PCT No.: PCT/US2018/066736
§ 371 (c)(1),
(2) Date: Jun. 19, 2020

(87) PCT Pub. No.: WO2019/126458
PCT Pub. Date: Jun. 27, 2019

(65) Prior Publication Data
US 2021/0080409 A1    Mar. 18, 2021

Related U.S. Application Data (60) Provisional application No. 62/779,673, filed on Dec. 14, 2018, provisional application No. 62/597,891, filed on Dec. 20, 2017.

(51) Int. Cl.
G01N 23/20008    (2018.01)
G01N 23/201    (2018.01)
(Continued)

(52) U.S. Cl.
CPC ......... *G01N 23/20008* (2013.01); *A61B 6/03* (2013.01); *G01N 23/046* (2013.01);
(Continued)

(58) Field of Classification Search
None
See application file for complete search history.

(56) References Cited

U.S. PATENT DOCUMENTS 8,041,004 B2 * 10/2011 David .................... A61B 6/484
378/36
8,781,069 B2 * 7/2014 Murakoshi ........... G01N 23/046
378/62
(Continued)

FOREIGN PATENT DOCUMENTS

CN    208109732 U  * 11/2018
CN    110108735 A  * 8/2019
(Continued)

OTHER PUBLICATIONS

Li, Guang et al. "Novel Detection Scheme for X-ray Small Angle Scattering", IEEE Transactions on Radiation and Plasma Medical Sciences, vol. 2, No. 4, Jul. 2018.*
(Continued)

*Primary Examiner* — Thomas R Artman
(74) *Attorney, Agent, or Firm* — Murtha Cullina LLP; Anthony P. Gangemi (57) ABSTRACT

A detection scheme for x-ray small angle scattering is described. An x-ray small angle scattering apparatus may include a first grating and a complementary second grating. The first grating includes a plurality of first grating cells. The complementary second grating includes a plurality of second grating cells. The second grating is positioned relative to the first grating. A configuration of the first grating, a configuration of the second grating and the relative positioning of the grating are configured to pass one or more small angle scattered photons and to block one or more Compton scattered photons and one or more main x-ray photons.

18 Claims, 5 Drawing Sheets

(51) Int. Cl.
*G01N 23/046* (2018.01)
*G21K 1/02* (2006.01)
*A61B 6/03* (2006.01)

(52) U.S. Cl.
CPC ........... *G01N 23/201* (2013.01); *G21K 1/025* (2013.01); *G01N 2223/054* (2013.01); *G01N 2223/1016* (2013.01); *G01N 2223/313* (2013.01); *G01N 2223/41* (2013.01)

(56) References Cited

U.S. PATENT DOCUMENTS

| | | | |
|---|---|---|---|
| 9,719,947 B2 * | 8/2017 | Yun | A61B 6/484 |
| 9,870,610 B2 * | 1/2018 | Makifuchi | A61B 6/5211 |
| 10,140,697 B2 * | 11/2018 | Makifuchi | A61B 6/4291 |
| 10,697,902 B2 * | 6/2020 | Sharma | G01N 23/20075 |
| 2009/0316857 A1 | 12/2009 | David et al. | |
| 2013/0235973 A1 * | 9/2013 | Murakoshi | A61B 6/4233 378/37 |
| 2015/0071402 A1 | 3/2015 | Handa | |
| 2015/0243397 A1 | 8/2015 | Yun et al. | |
| 2016/0379353 A1 | 12/2016 | Makifuchi | |
| 2018/0144456 A1 * | 5/2018 | Makifuchi | G06T 11/005 |
| 2018/0180558 A1 * | 6/2018 | Sano | G01N 23/041 |
| 2021/0080409 A1 * | 3/2021 | Wang | G01N 23/201 |
| 2021/0204890 A1 * | 7/2021 | Wang | A61B 6/0407 |

FOREIGN PATENT DOCUMENTS

| | | | | |
|---|---|---|---|---|
| CN | 210894172 U | * | 6/2020 | |
| WO | WO-2017143247 A1 | * | 8/2017 | A61B 6/484 |
| WO | WO-2019126458 A1 | * | 6/2019 | G01N 23/201 |

OTHER PUBLICATIONS

International Search Report and the Written Opinion of the International Searching Authority, International Application No. PCT/US2018/066736, dated Mar. 29, 2019.

* cited by examiner

DETECTION SCHEME FOR X-RAY SMALL ANGLE SCATTERING

CROSS REFERENCE TO RELATED APPLICATION(S)

This application claims the benefit of U.S. Provisional Application No. 62/597,891, filed Dec. 20, 2017, and U.S. Provisional Application No. 62/779,673, filed Dec. 14, 2018, which are incorporated by reference as if disclosed herein in their entirety.

FIELD

The present disclosure related to x-ray small angle scattering, in particular to, a detection scheme for x-ray small angle scattering.

BACKGROUND

X-ray imaging techniques, including x-ray radiography and computed tomography, have been in use for decades and provide relatively fine resolution and a relatively fast acquisition speed. X-ray imaging techniques may utilize one or more contrast mechanisms, including for example, attenuation and phase contrast. Existing x-ray imaging techniques may provide poor soft tissue contrast. For example, the x-ray attenuation coefficient is approximately proportional to the fourth power of the atomic number and biological soft tissues are relatively similar in their compositions of chemical elements. Thus, attenuation may provide a relatively poor soft tissue contrast making imaging soft tissue challenging.

SUMMARY

In some embodiments, an x-ray small angle scattering apparatus may include a first grating and a complementary second grating. The first grating includes a plurality of first grating cells. The complementary second grating includes a plurality of second grating cells. The second grating is positioned relative to the first grating. A configuration of the first grating, a configuration of the second grating and the relative positioning of the gratings are configured to pass one or more small angle scattered photons and to block one or more Compton scattered photons and one or more main x-ray photons.

In some embodiments, a method for x-ray small angle scattering may include emitting, by an x-ray source, an x-ray beam. The x-ray beam includes a plurality of photons. The method may further include detecting, by a detector, one or more small angle scattered photons. The scattering is related to an object to be imaged. The method may further include passing, by an x-ray small angle scattering apparatus, one or more small angle scattered photons; and blocking, by the x-ray small angle scattering apparatus, one or more Compton scattered photons and one or more main x-ray photons. The x-ray small angle scattering apparatus may include a first orating and a complementary second grating. The first grating includes a plurality of first grating cells. The complementary second grating includes a plurality of second grating cells. The second grating is positioned relative to the first grating. A configuration of the first grating, a configuration of the second grating and the relative positioning of the gratings are configured to pass one or more small angle scattered photons and to block one or more Compton scattered photons and one or more main x-ray photons.

In some embodiments, an x-ray system may include an x-ray source configured to emit an x-ray beam, a detector configured to detect one or more small angle scattered photons, the scattering related to an object to be imaged and an x-ray small angle scattering apparatus. The x-ray small angle scattering apparatus may include a first grating and a complementary second grating. The first grating includes a plurality of first grating cells. The complementary second grating includes a plurality of second grating cells. The second grating is positioned relative to the first grating. A configuration of the first grating, a configuration of the second grating and the relative positioning of the gratings are configured to pass one or more small angle scattered photons and to block one or more Compton scattered photons and one or more main x-ray photons.

In some embodiments, each first grating cell includes a first solid portion and an adjacent first hollow portion and each second grating cell includes a second solid portion and an adjacent second hollow portion. Each hollow portion and each solid portion have a width, $w_1$, and a height, $h_1$.

In some embodiments, each first hollow portion is aligned with a respective second solid portion and each first solid portion is aligned with a respective second hollow portion.

In some embodiments, the second grating is positioned a distance, $l_1$, from the first grating. In these embodiments, a size of a range of relatively small angles is related to the distance.

In some embodiments, the second grating is positioned a distance, $l_1$, from the first grating and a principal energy angle, $\theta_p$, is equal to $w_1/(h_1+l_1)$.

In some embodiments, the first grating has a first surface. The plurality of first grating cells are positioned between a detector and the opposing first surface. In these embodiments, the second grating has a second surface and an opposing third surface. The plurality of second grating cells is positioned between the second surface and the opposing third surface. The first surface and the second surface are separated by a distance, $l_1$.

In some embodiments, a distance between the detector and the first surface and a distance between the second surface and the third surface corresponds to a height, $h_1$, of the grating cells.

BRIEF DESCRIPTION OF THE DRAWINGS

The drawings show embodiments of the disclosed subject matter for the purpose of illustrating features and advantages of the disclosed subject matter. However, it should be understood that the present application is not limited to the precise arrangements and instrumentalities shown in the drawings, wherein.

DETAILED DESCRIPTION

Small angle scattering imaging may provide relatively better contrast for soft tissues. In one example, small angle scattering may provide positive correlation with the presence of breast cancer. Different tissues may have distinct coherent scattering profiles and separate scattering peaks. For example, scattering profiles from normal tissue have a relatively sharper peak at position $x=0.11$ Angstrom$^{-1}$ indicating the presence of an adipose component while the scattering profiles from malignant tissues present relatively broad scattering peaks at $x=0.17$ Angstrom$^{-1}$. The scattering peaks from fibrous collagen are positively related to fibril stacking and collagen fiber alignment. Thus, small angle scattering imaging may be utilized to provide additional information compared with a traditional absorption based computed tomography.

The detection scheme for x-ray small angle scattering, consistent with the present disclosure, does not require elaborately fabricated gratings nor precise control during scanning. Additionally and/or alternatively, the detection scheme for x-ray small angle scattering does not require expensive detectors nor approximations that may lead to performance degradation. Thus, characteristics of different tissues may be sensitively and reliably captured utilizing the detection scheme for x-ray small angle scattering.

Direct coherent scattering systems may be configured to differentiate subtle differences due to coherent scattering between different tissues. For example, some direct coherent scattering systems may be configured to perform slot scanning aided by a collimated detector. These systems may be configured to collect scattering signals at characteristic angles and may then obtain a two-dimensional material map point by point or line by line resulting in relatively low scanning efficiency. The detection scheme for x-ray small angle scattering, consistent with the present disclosure, is configured to capture scattering signals without performing slot scanning and may thus be relatively efficient.

Generally, the present disclosure relates to a detection scheme for x-ray small angle scattering. An apparatus, method and/or system may include two interlaced gratings. A first grating includes a plurality of first grating cells and a complementary second grating includes a plurality of second grating cells. The second grating is positioned relative to the first grating. A configuration of the first grating, a configuration of the second grating and the relative positioning of the gratings are configured to pass small angle scattered photons and to block Compton scattered photons and main x-ray photons. Thus, small angle scattered photons may reach a corresponding detector while Compton scattered photons and main x-ray photons may not reach the corresponding detector.

Figure 1A:
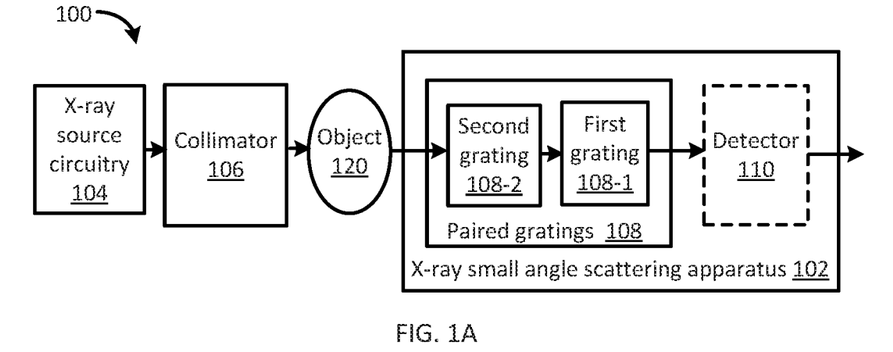
FIG. 1A illustrates a functional block diagram of a x-ray small angle scattering imaging system consistent with several embodiments of the present disclosure.

FIG. 1A illustrates a functional block diagram of a x-ray small angle scattering imaging system 100 consistent with several embodiments of the present disclosure. Imaging system 100 includes an x-ray small angle scattering apparatus 102. Imaging system 100 may fluffier include x-ray source circuitry 104 and collimator 106. Imaging system 100 may be configured to image object 120.

X-ray source circuitry 104 is configured to provide a beam of x-rays including a plurality of photons to collimator 106. Collimator 106 is configured to collimate the received beam of x-rays and to provide the collimated beam of x-rays to object 120. Object 120 is positioned between collimator 106 and x-ray small angle scattering apparatus 102. The collimated x-ray beams including the plurality of photons may pass through, and/or be scattered by, object 120. At least a portion of the x-ray beams that reach object 120 may pass through object 120 and be attenuated. At least a portion of the photons that reach object 120 may be scattered. Scattering may include Compton scattering and/or small angle scattering. At least some of the attenuated x-ray beams and at least some of these scattered photons may reach x-ray small angle scattering apparatus 102.

X-ray small angle scattering apparatus 102 includes paired gratings 108. Paired gratings 108 includes a first grating 108-1 and a complementary second grating 108-2. In an embodiment, the second grating 108-2 is positioned relative to the first grating 108-1, as will be described in more detail below. In one embodiment, x-ray small angle scattering apparatus 102 may include detector 110. In another embodiment, x-ray small angle scattering apparatus 102 may be coupled to detector 110. The first grating 108-1 is positioned between the second grating 108-2 and the detector 110. The first grating 108-1 may be coupled to the detector 110.

The x-ray small angle scattering apparatus 102 and paired gratings 108 are configured to receive at least some of the attenuated x-ray beams and at least some of these scattered photons. The scattered photons may include Compton scattered photons and small angle scattered photons. The paired x-ray gratings 108 are configured to block the attenuated x-ray beams and the Compton scattered photons and to pass the small angle scattered photons. The small angle scattered photons may then be received by detector 110. Detector 110 may be configured to output corresponding electrical signals representing the received small angle scattered photons. Each electrical signal of the corresponding electrical signals may be associated with a location, e.g., a pixel or pixels, included in detector 110. In other words, detector 110 may include an array of detector elements and each detector element may correspond to one or more pixels.

Thus, x-ray small angle scattering system 100 may be configured to generate and collimate an x-ray beam (including a plurality of photons) and to provide the collimated x-ray beam to object 120. X-ray small angle scattering apparatus 102 may then be configured to receive an attenuated x-ray beam and one or more scattered photons. Characteristics of the attenuated x-ray beams and scattered photons may be related to characteristics of the object 120. In one nonlimiting example, characteristics of the small angle scattered photons may be related to characteristics of soft tissue included in object 120. X-ray small angle scattering apparatus 102 and paired gratings 108 may be configured to block the attenuated x-ray beams and Compton scattered photons and to pass small angle scattered photons to detector 110.

Figure 1B:
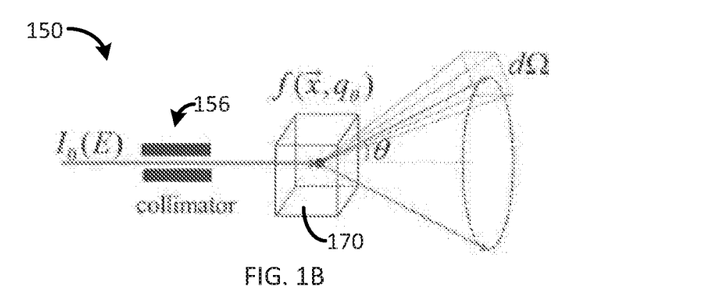
FIG. 1B is a sketch illustrating a scattering process consistent with several embodiments of the present disclosure.

FIG. 1B is a sketch 150 illustrating a scattering process consistent with several embodiments of the present disclosure. A number of incident x-ray photons per unit area $I_0(E)$ may be collimated by collimator 156 and may reach voxel 170 that has volume dV. The scattered photon count from voxel 170 may be written as:

$$dI_{scat}(E, \theta) = I_0(E)dV \frac{r_e^2}{2}(1 + \cos^2\theta)f(\vec{x}, q_\theta) \qquad (1)$$

where $I_0(E)$ is the number of incident x-ray photons per unit area, dV is the volume of the voxel 170, $r_e$ is the classical electron radius, $\theta$ is the scatter angle, $f(\vec{x}, q_\theta)$ is the scatter factor at location $\vec{x}=(x, y, z)$, and $q_\theta$ is the momentum transfer. The momentum transfer may be written as:

$$q_\theta = \frac{E\sin(\theta/2)}{hc} \qquad (2)$$

where h is the Planck constant and c is the speed of light. Combining Equations (Eqs.) (1) and (2), the general formula of the total scatter irradiance detected at the pixel $\vec{x}_d$ on the detector may be derived as:

$$I_{scat}(E, \vec{x}) = \int_V \int_q \int_\Omega I_0(E, \vec{x}) \frac{r_e^2}{2}(1 + \cos^2\theta)\delta f(\vec{x}, q)d\Omega dq dV \qquad (3)$$

$$\text{where } \delta = \delta\left(q - \frac{E\sin(\theta/2)}{hc}\right)$$

and $\Omega$ is a solid angle covered by one pixel of a detector, e.g., detector 110.

Figure 2:
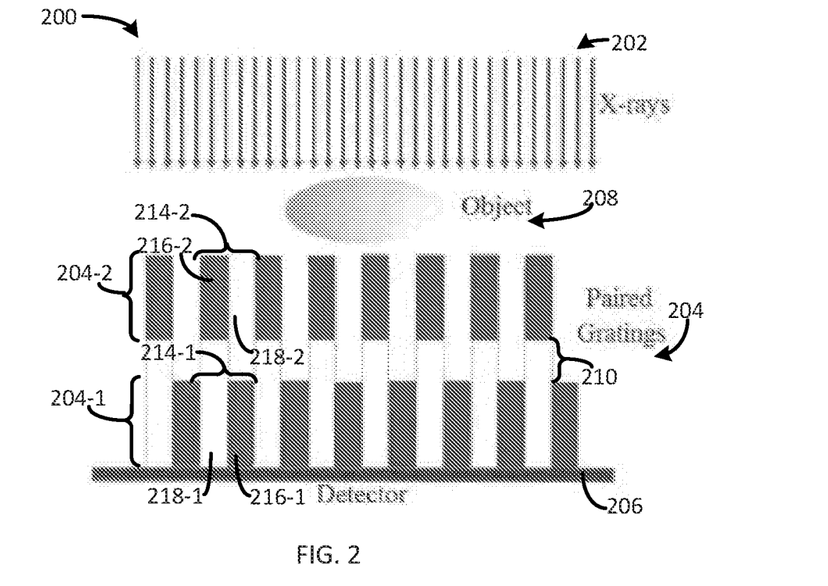
FIG. 2 is a sketch illustrating a parallel beam geometry consistent with several embodiments of the present disclosure.

FIG. 2 is a sketch 200 illustrating a parallel beam geometry consistent with several embodiments of the present disclosure. The parallel beam geometry 200 includes a plurality of collimated x-ray beams 202, paired gratings 204 and a detector 206. The plurality of collimated x-ray beams contains a plurality of photons. The parallel beam geometry 200 further includes an object to be imaged 208 positioned between the collimated x-ray beams 202 and the paired gratings 204. The paired gratings 204 include a first grating 204-1 and a complementary second grating 204-2. The first grating 204-1 is positioned between the second grating 204-2 and the detector 206 and is coupled to the detector 206. The second grating 204-2 is positioned a distance 210 relative to the first grating 204-1. The distance 210 corresponds to a gap between the first grating 204-1 and the complementary second grating 204-2.

Each grating 204-1, 204-2 includes a plurality of grating cells, e.g., first grating cell 214-1 and second grating cell 214-2, Each grating cell has a configuration that includes a solid portion and an adjacent hollow portion. Thus, for example, the first grating cell 214-1 includes a first solid portion 216-1 and an adjacent first hollow portion 218-1 and the second grating cell 214-2 includes a second solid portion 216-2 and an adjacent second hollow portion 218-2. In one nonlimiting example, each solid portion, e.g., solid portions 216-1, 216-2, may contain tungsten. In another nonlimiting example, each solid portion, e.g., solid portions 216-1, 216-2, may contain lead. The hollow portions, e.g., hollow portions 218-1, 218-2, may contain nothing. In other words, the hollow portions may correspond to air.

The first solid portion 216-1 may be aligned with the second hollow portion 218-2 and the first hollow portion 218-1 may be aligned with the second solid portion 216-2. The configuration of the first grating 204-1, the configuration of the second grating 204-2 and the relative positioning of the gratings 204-1, 204-2 are configured to pass one or more small angle scattered photons and to block one or more Compton scattered photons and one or more main x-ray photons, as will be described in more detail below. The photons may correspond to photons included in x-ray beams 202 that have passed through, and/or been scattered by, object 208. Thus, the first grating 204-1 and the second grating 204-2 may be complementary and are configured to block primary parallel x-ray beams and to pass scattered photons that arrive at the paired gratings 204 at a small angle included in a range of relatively small angles. A size of the range of relatively small angles is related to the distance 210, i.e., the size of the gap. Thus, the relative positioning of the second grating 204-2 with respect to the first grating 204-1 is configured to affect an incidence angle of small angle scattered photons that may be passed, i.e., may be allowed to reach detector 206. The small angle photons that reach detector 206 may then be detected by detector 206 that is coupled to the first grating 204-1.

Figure 3:
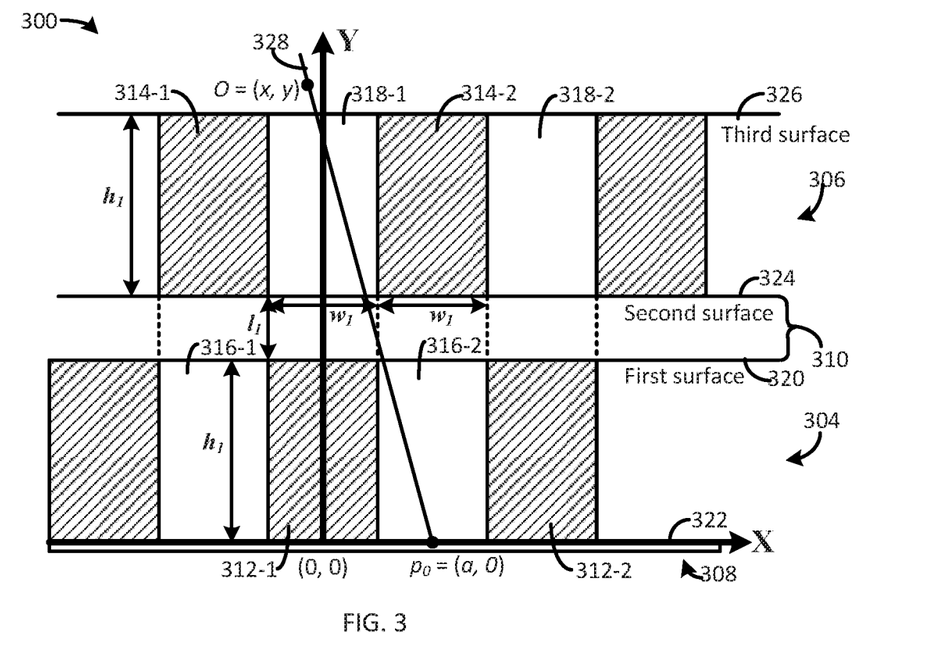
FIG. 3 is a sketch of a portion of one example x-ray small angle scattering apparatus according to the present disclosure.

FIG. 3 is a sketch of a portion of one example x-ray small angle scattering apparatus 300 apparatus according to the present disclosure. FIG. 3 illustrates a relative positioning of a configuration of a first grating 304 and a configuration of a complementary second grating 306. The example x-ray small angle scattering apparatus 300 further includes a detector 308. The sketch of the example x-ray small angle scattering apparatus 300 is configured to illustrate geometrical parameters associated with the configurations of the gratings 304, 306 and their relative positioning.

Sketch 300 includes a horizontal X-axis and a vertical Y-axis. The axes are to facilitate description of the configuration and relative positioning of the first and second gratings 304, 306. Each grating 304, 306 includes a plurality of grating cells and each grating cell includes a solid portion and an adjacent hollow portion. For example, the first grating 304 includes solid portions 312-1 and 312-2 and hollow portions 316-1 and 316-2. Solid portion 312-1 and adjacent hollow portion 316-1 may correspond to a grating cell and solid portion 312-2 and hollow portion 316-2 may correspond to a grating cell. The second grating 306 includes solid portions 314-1 and 314-2 and hollow portions 318-1 and 318-2. Solid portion 314-1 and adjacent hollow portion 318-1 may correspond to a grating cell and solid portion 314-2 and hollow portion 318-2 may correspond to a grating cell. The first grating solid portion 312-1 and the second grating hollow portion 318-1 are aligned and centered on the Y axis.

The first grating 304 has a first surface 320 and an opposing detector surface 322. The detector surface 322 corresponds to the X axis. The second grating 306 has a second surface 324 and an opposing third surface 326. The surfaces 320, 322, 324 and 326 are generally planar and are perpendicular to the Y-axis, are parallel to an XZ plane in a three-dimensional Cartesian coordinate system).

The first surface 320 is separated from the second surface 324 by a gap 310. A photon, e.g., a scattered photon, may approach x-ray small angle scattering apparatus 300 from a position above the third surface 326 in the Y direction (e.g., from a point $O=(x, y)$, $y>2h_1+l_1$, as described herein). A small angle scattered photon whose scattered angle is within the range of angles to be passed by x-ray small angle scattering apparatus 300 may travel path 328 from the position above the third surface 326 through a hollow portion of the second grating 306 then through the gap 310 then through a hollow portion of the first grating 304 to then reach detector surface 322 and thus detector 308. A position along path 328 may correspond, in the XY coordinate system, to point $O=(x, y)$. The path 328 ends on detector surface 322 at position $p_0=(a, 0)$ corresponding to a point on the X axis and the detector surface 322.

A size of the range of small angles is related to geometrical parameters associated with the first grating 304 and the second grating 306. Geometrical parameters may include, but are not limited to, a height, $h_1$, a width, $w_1$ and a distance, $l_1$. $h_1$ is the height of each grating cell and thus height of each corresponding solid portion and each corresponding hollow portion. $w_1$ is the width of each solid portion and the width of each hollow portion, thus the width of each grating cell is $2w_1$. $l_1$ is the distance between the first surface 320 of the first grating 304 and the second surface 324 of the second grating 306, Thus, $l_1$ corresponds to a length of gap 310.

It may be appreciated that each solid portion of a grating cell included in the first grating 304 is aligned with a respective hollow portion of a grating cell included in the second grating 306. Similarly, each hollow portion of a grating cell included in the first grating 304 is aligned with a respective solid portion of a grating cell included in the second grating 306. Thus, in the coordinate system of example 300, solid portion 312-1 of the first grating 304 and hollow portion 318-1 of the second grating 306, centered on the Y axis, extend between $-w_1/2$ and $+w_1/2$ in the X direction. Similarly, hollow portion 316-2 and solid portion 314-2 extend between $w_1/2$ and $3w_1/2$. In the vertical direction, each solid portion and each hollow portion of the first grating 304, e.g., solid portion 312-1 and hollow portion 316-2, extends between zero and $h_1$ in the Y direction, the gap 310 extends between $h_1$ and $h_1+l_1$ and each solid portion and each hollow portion of the second grating 306, e.g., hollow portion 318-1 in solid portion 314-2, extends between $h_1+l_1$ and $2h_1+l_1$.

In operation, for a scattered photon positioned at point $O=(x, y)$ above the third surface 326 to reach the point $p_0=(a, 0)$ on the detector surface 322, the scattered photon may pass through the third surface 326, the second surface 324 and the first surface 320 along, for example, path 328 without being attenuated by the solid portions of the first and second gratings 304, 306. Geometrically, any point along path 328 should simultaneously satisfy Eqs. (4.1), (4.2), (4.3) and (4.4).

$$\begin{cases} -\dfrac{w_1}{2} < a + \dfrac{(2h_1+l_1)(x-a)}{y} < \dfrac{w_1}{2} & (4.1) \\[6pt] -\dfrac{w_1}{2} < a + \dfrac{(h_1+l_1)(x-a)}{y} < \dfrac{w_1}{2} & (4.2) \\[6pt] \dfrac{w_1}{2} < a + \dfrac{h_1(x-a)}{y} < \dfrac{3w_1}{2} & (4.3) \\[6pt] \dfrac{w_1}{2} < a < \dfrac{3w_1}{2} & (4.4) \end{cases}$$

Satisfying Eqs. (4.1) to (4.3) means that a scattered photon initially positioned at point $O=(x, y)$ can pass through the third surface 326, the second surface 324 and first surface 320. Satisfying Eq. (4.4) means that the photon can successfully reach the detector surface 322 and detector 308. Simplifying the set of equations (4.1) through (4.4), it may be appreciated that if $a > h_1 w_1/(h_1+l_1)+w_1/2$, then the following relationship holds:

$$\frac{-\dfrac{w_1}{2}-a}{2h_1+l_1}y + a < x < \frac{\dfrac{w_1}{2}-a}{h_1+l_1}y + a \quad (5)$$

Otherwise, i.e., if $a \leq h_1 w_1/(h_1+l_1)+w_1/2$, then the following relationship holds:

$$\frac{\dfrac{w_1}{2}-a}{h_1}y + a < x < \frac{\dfrac{w_1}{2}-a}{h_1+l_1}y + a \quad (6)$$

From Eqs. (5) and (6), the angular range for scattering signals to arrive at $p_0=(a, 0)$ may be derived as:

$$\arctan\frac{a-\dfrac{w_1}{2}}{h_1+l_1} < \theta(a) < \arctan\frac{a+\dfrac{w_1}{2}}{2h_1+l_1} \text{ or} \quad (7)$$

$$\arctan\frac{a-\dfrac{w_1}{2}}{h_1+l_1} < \theta(a) < \arctan\frac{a-\dfrac{w_1}{2}}{h_1} \quad (8)$$

depending on the position of the point $p_0$. In the above equations, the size of the parameter $h_1$ is related to the material of the grating. In one nonlimiting example, $h_1$ may be on the order of tens of micrometers (μm). If $l_1$ is much larger than $h_1$, most of the points in the range $(w_1/2, 3w_1/2)$ will satisfy Eqs. (5) and (7), otherwise it is the opposite. As the scattering angle ought to be relatively small, Eqs. (7) and (8) can be simplified as follows:

$$\frac{a-\dfrac{w_1}{2}}{h_1+l_1} < \theta(a) < \frac{a+\dfrac{w_1}{2}}{2h_1+l_1} \quad (9)$$

$$\frac{a-\dfrac{w_1}{2}}{h_1+l_1} < \theta(a) < \frac{a-\dfrac{w_1}{2}}{h_1} \quad (10)$$

A variable $E(\theta)$, corresponding to an energy distribution function, may be defined as:

$$E(\theta') = \int_{w_1/2}^{3w_1/2} T(a)da = \int_{w_1/2}^{w_1/2 + \frac{h_1}{h_1+l_1}w_1} T(a)da + \int_{w_1/2+\frac{h_1}{h_1+l_1}w_1}^{3w_1/2} T(a)da \quad (11)$$

In Eq. (11), $\theta' = \tau/(h_1+l_1)$, $\tau \in (0, 2w_1(h_1+l_1)/(2h_1+l_1))$ and $T(a)$ can be written as:

$$T(a) = \begin{cases} 1 & \theta' \in \theta(a) \\ 0 & \theta' \notin \theta(a) \end{cases} \quad (12)$$

The first item in the rightmost side of Eq. (11) can be noted as:

$$E_1(\theta') = \int_{w_1/2}^{w_1/2+\frac{h_1}{h_1+l_1}w_1} Q\left[a - \left(\frac{w_1}{2} + \frac{h_1}{h_1+l_1}\tau\right)\right] - Q\left[a - \left(\tau + \frac{w_1}{2}\right)\right]da = \int_{w_1/2+\frac{h_1}{h_1+l_1}\tau}^{w_1/2+\frac{h_1}{h_1+l_1}w_1} da - \int_{\tau+w_1/2 \& \tau < \frac{h_1}{h_1+l_1}w_1}^{w_1/2+\frac{h_1}{h_1+l_1}w_1} da \quad (13)$$

and the second term can be written as:

$$E_2(\theta') = \int_{w_1/2+\frac{h_1}{h_1+l_1}w_1}^{3w_1/2} Q\left[a - \left(\frac{2h_1+h_1}{h_1+l_1}\tau - \frac{w_1}{2}\right)\right] - Q\left[a - \left(\tau + \frac{w_1}{2}\right)\right]da = \int_{min\left(w_1/2+\frac{h_1}{h_1+l_1}w_1, \frac{2h_1+l_1}{h_1+l_1}\tau - \frac{w_1}{2}\right)}^{3w_1/2} da - \int_{\tau+\frac{w_1}{2} \& \tau < w_1}^{3w_1/2} da \quad (14)$$

in which the Q is a step function whose value is equal to 1 when its argument is greater than zero; otherwise, Q is equal to 0. Combining Eqs. (13) and (14), it may be concluded that:

$$E\left(\frac{\tau}{h_1+l_1}\right) = \begin{cases} \frac{l_1}{h_1+l_1}\tau & 0 \le \tau < w_1 \\ \frac{l_1}{h_1+l_1}w_1 & \tau = w_1 \\ 2w_1 - \frac{2h_1+l_1}{h_1+l_1}\tau & w_1 < \tau \le \frac{2(h_1+l_1)}{h_1+l_1}w_1 \end{cases} \quad (15)$$

From Eq. (15), it is seen that the acquired small angle scattered photons from different angles approximately form a triangular distribution. The principal energy cluster is around the angle:

$$\theta_p = \frac{w_1}{h_1+l_1} \quad (16)$$

Eq. (15) is a standard triangular distribution. The range of distribution depends on the ratio of $w_1$ to $h_1+l_1$.

Given a specific scattering angle, the relationship between the geometrical parameters may be determined according to Eq. (15). It may be appreciated that the parallel beam geometry 200 illustrated in FIG. 2 has a left-right symmetry, thus, the energy distribution function $E(\theta')$ May be an even function which means it can be modified as:

$$E\left(\frac{\tau}{h_1+l_1}\right) = \begin{cases} \frac{l_1}{h_1+l_1}|\tau| & 0 \le |\tau| < w_1 \\ \frac{l_1}{h_1+l_1}w_1 & |\tau| = w_1 \\ 2w_1 - \frac{2h_1+l_1}{h_1+l_1}|\tau| & w_1 < |\tau| \le \frac{2(h_1+l_1)}{h_1+l_1}w_1 \end{cases} \quad (17)$$

Eq. (17) can be treated as a response function of an x-ray small angle scattering system consistent with the present disclosure. Assuming that the scattering signal from a position $M=(x, z)$ along a direction $\theta$ is $f(M, \theta)$, and there is not any absorption for the scattering signal when it passes through the sample (i.e., objects to be imaged), the captured scattering signal can be represented as:

$$F(x') = \sum_z f(x, z, \theta) * E(\theta)\bigg|_{x'=x \pm z\theta} \quad (18)$$

Assuming that the most energy is captured at the principal angle yields:

$$F(x') = w_1 \sum_z f(x, z, \theta) * \delta(\theta - \theta_p)\bigg|_{x'=x \pm z\theta_p} = w_1 \sum_z f(x, z, \theta_p)\bigg|_{x'=x \pm z\theta_p} \quad (19)$$

Eq. (19) may be generalized to the two dimensional case as:

$$F(x', y') = w_1 \sum_z f(x, y, z, \theta) * \delta(\theta - \theta_p)\bigg|_{\sqrt{x'^2+y'^2} = \sqrt{x^2+y^2} \pm z\theta_p} = w_1 \sum_z f(x, y, z, \theta_p)\bigg|_{\sqrt{x'^2+y'^2} = \sqrt{x^2+y^2} \pm z\theta_p} \quad (20)$$

Eqs. (19) and (20) may be suitable for one-dimensional and two-dimensional cases, respectively. In the one-dimensional case, the scattering signal from one point is converted to two points and in the two-dimensional case it is converted to a circle of radius $z\theta_p$.

Figure 4:
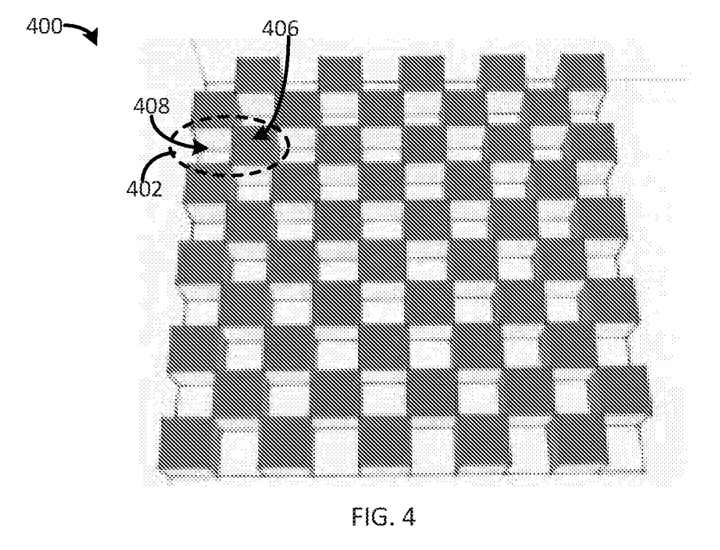
FIG. 4 is a perspective view of a two-dimensional grating corresponding to each of a first grating and a complementary second grating of a two-dimensional grating pair.

FIG. 4 is a perspective view 400 of a two-dimensional grating corresponding to each of a first grating and a complementary second grating of a two-dimensional grating pair. The two-dimensional grating 400 includes a plurality of grating cells and each grating cell includes a solid portion and a hollow portion, e.g., grating cell 402 that includes solid portion 406 and hollow portion 408. Thus, each layer of the corresponding two-dimensional grating geometry may appear as a chessboard.

EXAMPLES in the following examples, a grating pair that included a first grating and a complementary second grating was simulated. The first grating and the second grating were two-dimensional gratings similar to the two-dimensional grating 400 illustrated in FIG. 4. An electron gamma shower (EGS) simulation system (e.g., EGSnrc simulation system available from National Research Council Canada, Ottawa, Ontario, Canada) configured to model the passage of electrons and/or photons through matter and Monte Carlo simulation were used to simulate an x-ray small angle scattering system. The simulations were performed in parallel beam geometry with x-rays of mono energy at 20 kilo-electron volts (keV). The total number of photons was set to $1.0 \times 10^{10}$. The detector was configured with a pixel size of 0.4 millimeters (mm), 50×50 pixels per frame and each pixel covered 10×10 cells.

Figure 5A:
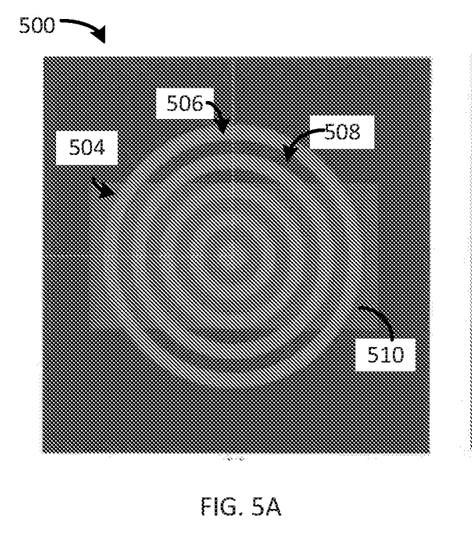
FIGS. 5A and 5B illustrate a sagittal view and a coronal view, respectively of a plurality of concentric cylinders numerical phantom used in the simulations.
Figure 5B:
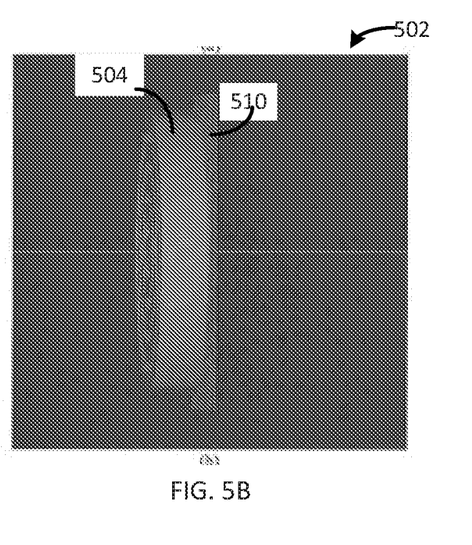

FIGS. 5A and 5B illustrate a sagittal view 500 and a coronal view 502, respectively of a plurality of concentric cylinders numerical phantom 504 used in the simulations. The numerical phantom 504 includes a plurality of concentric cylinders, e.g., cylinder 506. The cylinders were modeled as fibroglandular tissue whose intensity was 1.04 grams per cubic centimeter ($g/cm^3$) with a mass fraction of carbon, hydrogen and oxygen of 0.185:0.094:0.68. The concentric cylinders were separated by hollow portions, e.g., hollow portion 508. The hollow portions were filled with nothing, e.g., may correspond to air. Thus, the phantom 504 included alternating solid cylinders with hollow cylindrical shapes. The radii of the cylinders from the innermost cylinder to the outermost cylinder were 1 mm to 9 mm, with a common difference of 1 mm.

A paired grating 510 including a first grating and a second grating, as described herein, was positioned behind the phantom 504. In the simulations, the solid portions of the grating cells were made of tungsten. The width, $w_1$, of each solid portion and each hollow portion of each grating cell was 25 μm and the height, $h_1$, of each grating cell was 120 μm. The length (i.e., distance), $l_1$ of the gap between the first grating in the second grating was adjustable. Adjusting the gap length may be configured to modify the incident angle of the scattering x-rays, e.g., photons, that may travel through the grating pair without attenuation to reach the detector. In the following examples, the length of the gap was 300 μm, thus, the principal energy angle, $\theta_p$ was about 3.4 degrees.

In this example, the paired grating 510 was configured to cover the whole phantom 504 in the horizontal direction and half of the phantom 504 in the vertical direction. A cross section of the incident parallel beam was configured to be the same size as the paired grating 510. The phantom 504 was configured with a thickness 4 mm and was positioned a distance 0.5 mm away from the paired grating 510.

Figure 6A:
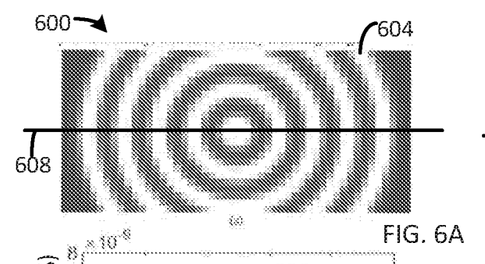
FIG. 6A illustrates an acquired scattering image for the phantom of FIGS. 5A and 5B.
Figure 6B:
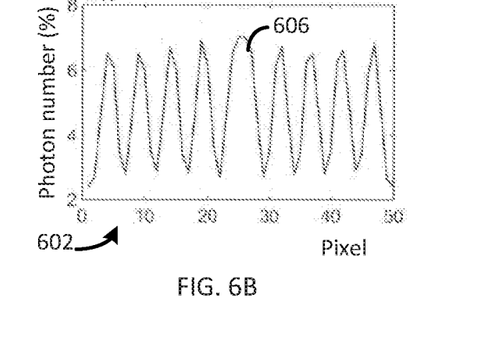
FIG. 6B illustrates a plot of a profile along a central horizontal line of the scattering image of FIG. 6A.

FIG. 6A illustrates an acquired scattering image 600 for the phantom of FIGS. 5A and 5B. FIG. 6B illustrates a plot 602 of a profile 606 along a central horizontal line 608 of the scattering image 600 of FIG. 6A. In the plot 602, the horizontal axis corresponds to pixels and the vertical axis corresponds to photon number in units of percent. It may be appreciated that scattering image 600 is isotropic and is similar to the pattern inside the phantom 504 of FIG. 5A. The scattering image 600 and the phantom 504 are positive related, meaning that the solid portions, e.g., solid portion 506, of the phantom 504 correspond to the bright parts, e.g., bright part 604, of the acquired scattering image 600.

Figure 7A:
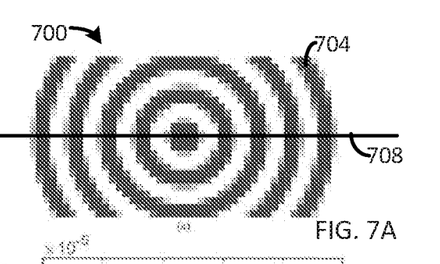
FIG. 7A illustrates an absorption image of the phantom of FIGS. 5A and 5B.
Figure 7B:
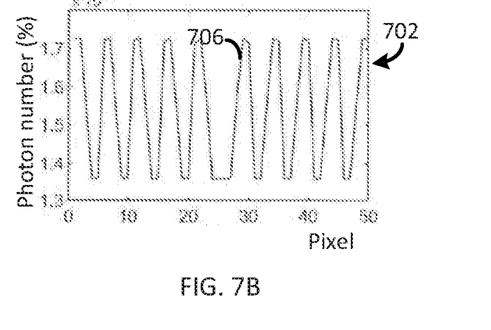
FIG. 7B illustrates a plot of a profile along a central horizontal line of the absorption image of FIG. 7A.

FIG. 7A illustrates an absorption image 700 of the phantom 504 of FIGS. 5A and 5B. FIG. 7B illustrates a plot 702 of a profile 706 along a central horizontal line 708 of the absorption image 700 of FIG. 7A. In the plot 702, the horizontal axis corresponds to pixels and the vertical axis corresponds to photon number in units of percent. It may be appreciated that absorption image 700 corresponds to a negative of line integrals through the phantom meaning the solid portions, e.g., solid portion 506, of the phantom correspond to dark parts, e.g., dark part 704, of the raw data profiles. The absorption image 700 is similar to the pattern inside the phantom 504 of FIG. 5. The absorption image 700 and the phantom 504 are negatively related, meaning that the solid portions, e.g., solid portion 506, of the phantom 504 correspond to the dark parts, e.g., dark part 704, of the absorption image 700.

Thus, it may be appreciated that, the respective patterns of scattering image 600 and absorption image 700 are similar except that corresponding pixels have reversed gray scales. Comparing profiles 606 and 706, the absorption image profile 706 is relatively more similar to a piecewise constant function while the scattering image profile 606 has sharp peaks and valleys which is a bit different from the absorption image profile 706. It is contemplated that, because the phantom is composed of many fine structures, each of which may only cover several pixels, the acquired scattering signal may be treated as the convolution of the structures with a narrow symmetrical continuous response function. In other words, the acquired scattering image 600 may be consistent with the absorption image 700 except for a relatively small difference at the boundaries.

Figure 8A:
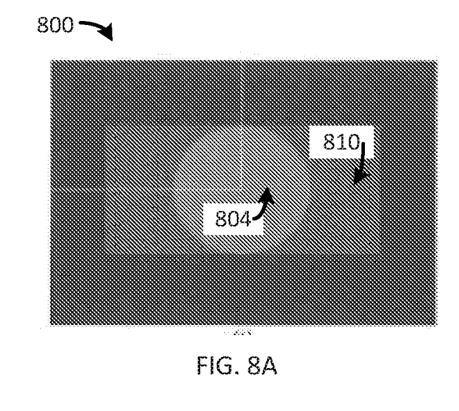
FIGS. 8A and 8B illustrate a sagittal view and a coronal view, respectively, of a large cylinder numerical phantom used in the simulations.
Figure 8B:
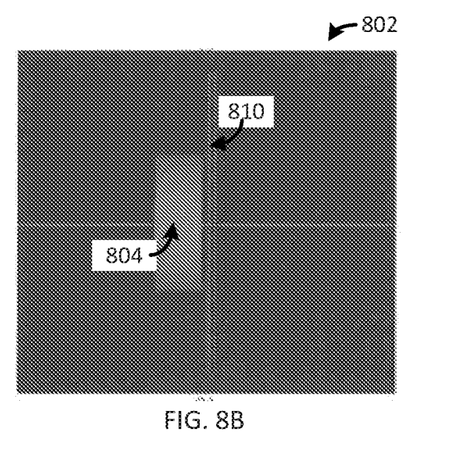

FIGS. 8A and 8B illustrate a sagittal view 800 and a coronal view 802, respectively, of a large cylinder numerical phantom 804 used in the simulations. The numerical phantom 804 corresponds to a large cylinder. The cylinder was modeled as fibroglandular tissue whose intensity was 1.04 grams per cubic centimeter ($g/cm^3$) with a mass fraction of carbon, hydrogen and oxygen of 0.185:0.094:0.68. The large cylinder 804 included no fine structures, thus, the phantom 804 corresponded to a solid cylinder. The radius of the cylinder was set to 5 mm. A paired grating 810 including a first grating and a second grating, as described herein, was positioned behind the phantom 804. The cylinder 804 was configured to cover the entire paired grating 810 along the vertical direction. The paired grating 810 was configured the same dimensions and material) as the paired grating 510 of FIGS. 5A and 5B.

Figure 9A:
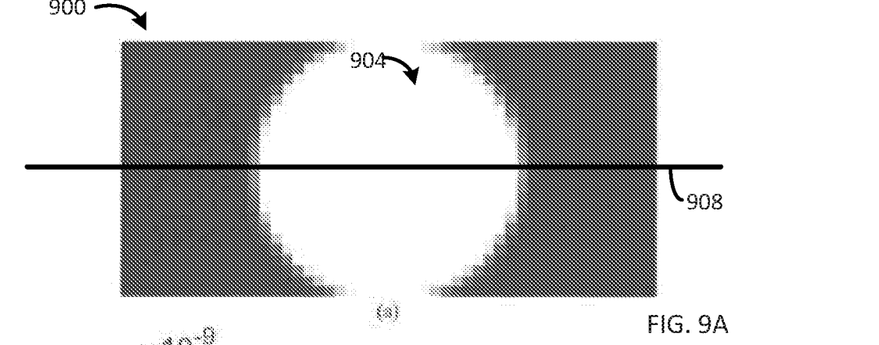
FIG. 9A illustrates an acquired scattering image for the relatively large solid cylinder phantom of FIGS. 8A and 8B.
Figure 9B:
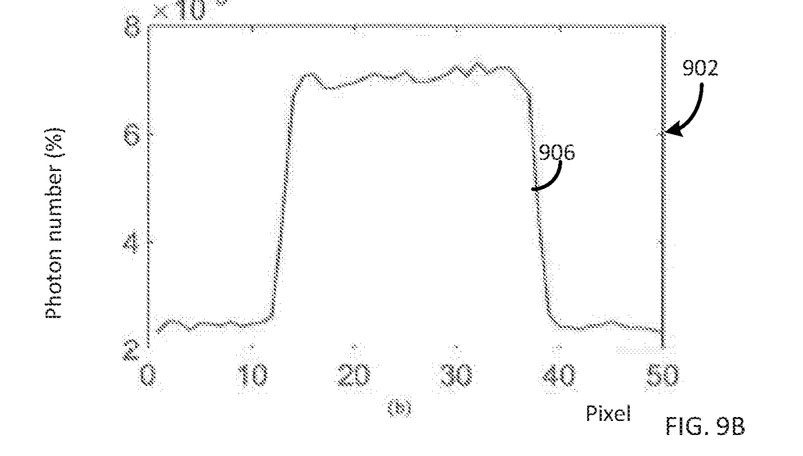
FIG. 9B illustrates a plot of a profile along a central horizontal line of the scattering image of FIG. 9A.

FIG. 9A illustrates an acquired scattering image 900 for the relatively large solid cylinder phantom of FIGS. 8A and 8B. FIG. 9B illustrates a plot 902 of a profile 906 along a central horizontal line 908 of the scattering image 900 of FIG. 9A for the relatively large solid cylinder phantom 804 of FIGS. 8A and 8B. In the plot 902, the horizontal axis corresponds to pixels and the vertical axis corresponds to photon number in units of percent. It may be appreciated that the profile 906 has a relatively flat central portion (e.g., between about 12 pixels and about 38 pixels) that is similar to a parallel beam absorption image.

Thus, detected small angle scattering signals using an x-ray small angle scattering system consistent with the present disclosure may allow spatial resolution similar to that of a corresponding absorption system. In other words, the captured small angle scattering signals (i.e., photons) may reflect structural information with relatively high resolution in the small angle scattering contrast. Advantageously, such information may be informative for cancer imaging.

Figure 10A:
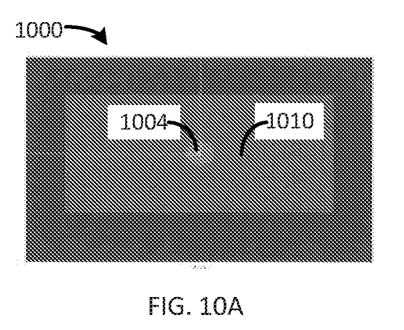
FIGS. 10A and 10B illustrate a sagittal view and a coronal view, respectively, of a small solid cylinder numerical phantom used in the simulations.
Figure 10B:
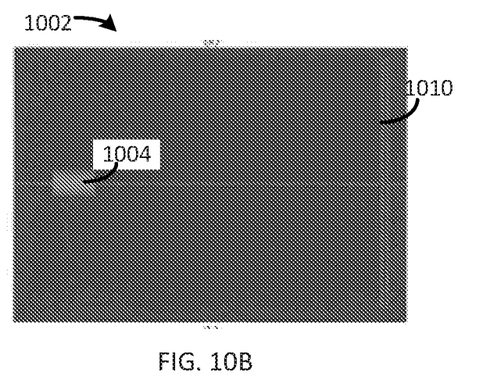

FIGS. 10A and 10B illustrate a sagittal view 1000 and a coronal view 1002, respectively, of a small solid cylinder numerical phantom 1004 used in the simulations. The numerical phantom 1004 corresponds to a small cylinder. The small cylinder 1004 had a radius of 1 mm and a height of 4 mm. The cylinder 1004 was modeled as a fibroglandular tissue, as described herein. A paired grating 1010 including a first grating and a second grating, as described herein, was positioned a distance 2 centimeters (cm) from the phantom 1004. The paired grating 1010 was configured the same (i.e., dimensions and material) as the paired grating 510 of FIGS. 5A and 5. The small cylinder phantom 1004 and paired grating 1010 were configured to model a single point positioned a distance from the paired grating to determine whether a corresponding scattering signal would be in the shape of a circle.

Figure 11A:
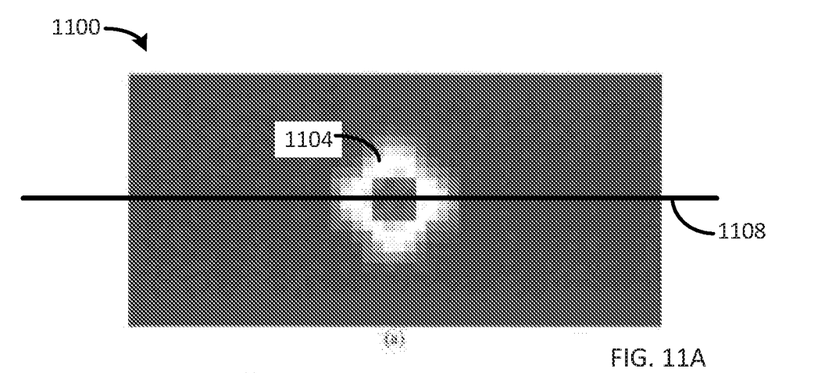
FIG. 11A illustrates an acquired scattering image for the small solid cylinder phantom of FIGS. 10A and 10B.
Figure 11B:
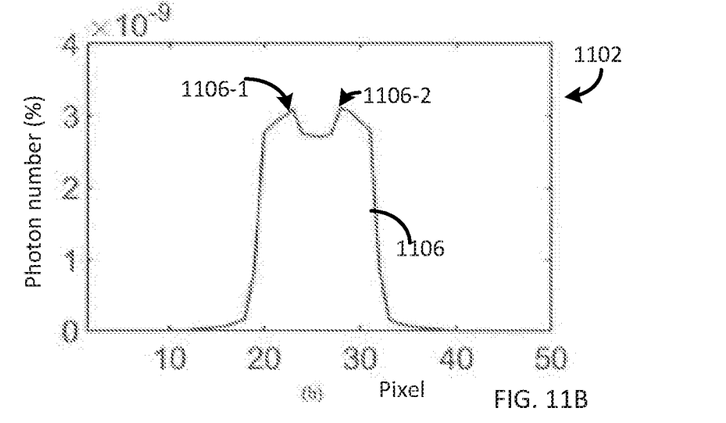
FIG. 11B illustrates a plot of a profile along a central horizontal line of the scattering image of FIG. 11A.

FIG. 11A illustrates an acquired scattering image 1100 for the small solid cylinder phantom of FIGS. 10A and 10B. FIG. 11B illustrates a plot 1102 of a profile 1106 along a central horizontal line 1108 of the scattering image 1100 of FIG. 11A for the small solid cylinder phantom 1004 positioned 2 cm from the paired grating 1010 of FIGS. 10A and 10B. In the plot 1102, the horizontal axis corresponds to pixels and the vertical axis corresponds to photon number in units of percent. It may be appreciated that the scattering image 1100 is generally circular. It may be appreciated that the profile 1106 includes two peaks 1106-1, 1106-2. A distance between the two peaks was about 6 pixels meaning that a principal value was located at a position 3 pixels away from the center. Given a principal energy angle $\theta_p$ of about 3.4°, the distance from the centroid of the phantom to the detector is 2.2 cm and a relationship as described herein, the peak of the circle should be about 3.26 pixels away from the center. Thus, the simulation results were in general agreement with the formulas presented herein.

Generally, the present disclosure relates to a detection scheme for x-ray small angle scattering. An apparatus, method and/or system may include two interlaced gratings. A first grating includes a plurality of first grating cells and a complementary second grating includes a plurality of second grating cells. The second grating is positioned relative to the first grating. A configuration of the first grating, a configuration of the second grating and the relative positioning of the gratings are configured to pass small angle scattered photons and to block Compton scattered photons and main x-ray photons. Thus, small angle scattered photons may reach a corresponding detector while Compton scattered photons and main x-ray photons may not reach the corresponding detector.

Thus, detected small angle scattering signals using an x-ray small angle scattering system consistent with the present disclosure may allow spatial resolution similar to that of a corresponding absorption system. In other words, the captured small angle scattering signals (i.e., photons) may reflect structural information with relatively high resolution in the small angle scattering contrast. Advantageously, such information may be informative for cancer imaging.

It is contemplated that although the examples of the x-ray small angle scattering system described herein were based on parallel beam incident x-rays, the x-ray small angle scattering system may be extended to fan beam and/or cone beam incident x-rays by, for example, modifying the geometrical parameters to control the incidence angle of incoming scattering x-rays. It is further contemplated that a two-dimensional grating may be hexagonal or circular.

What is claimed is:

1. An x-ray small angle scattering apparatus comprising:
a first grating comprising a plurality of first grating cells; and
a complementary second grating comprising a plurality of second grating cells, the second grating positioned relative to the first grating,
a configuration of the first grating, a configuration of the second grating and the relative positioning of the gratings configured to pass one or more small angle scattered photons and to block one or more Compton scattered photons and one or more main x-ray photons;
wherein each first grating cell comprises a first solid portion and an adjacent first hollow portion and each second grating cell comprises a second solid portion and an adjacent second hollow portion, each hollow portion and each solid portion having a width, $w_1$, and a height, $h_1$.

2. The apparatus of claim 1, wherein each first hollow portion is aligned with a respective second solid portion and each first solid portion is aligned with a respective second hollow portion.

3. The apparatus of claim 1, wherein the second grating is positioned a distance, $l_1$, from the first grating, a range of angles of the small angle scattered photons is related to the distance.

4. The apparatus of claim 2, wherein the second grating is positioned a distance, $l_1$, from the first grating and a principal energy angle, $\theta_p$, is equal to $w_1/(h_1+l_1)$.

5. The apparatus of claim 1, wherein the first grating has a first surface, the plurality of first grating cells positioned between a detector and the opposing first surface, and the second grating has a second surface and an opposing third surface, the plurality of second grating cells positioned between the second surface and the opposing third surface, the first surface and the second surface separated by a distance, $l_1$.

6. The apparatus of claim 5, wherein a distance between the detector and the first surface and a distance between the second surface and the third surface corresponds to a height, $h_1$, of the grating cells.

7. A method for x-ray small angle scattering, the method comprising:
emitting, by an x-ray source, an x-ray beam, the x-ray beam comprising a plurality of photons;
detecting, by a detector, one or more small angle scattered photons, the scattering related to an object to be imaged;
passing, by an x-ray small angle scattering apparatus, one or more small angle scattered photons; and
blocking, by the x-ray small angle scattering apparatus, one or more Compton scattered photons and one or more main x-ray photons,
the x-ray small angle scattering apparatus comprising:
a first grating comprising a plurality of first grating cells, and
a complementary second grating comprising a plurality of second grating cells, the second grating positioned relative to the first grating,
a configuration of the first grating, a configuration of the second grating and the relative positioning of the gratings configured to pass one or more small angle scattered photons and to block one or more Compton scattered photons and one or more main x-ray photons;
wherein each first grating cell comprises a first solid portion and an adjacent first hollow portion and each second grating cell comprises a second solid portion and an adjacent second hollow portion, each hollow portion and each solid portion having a width, $w_1$, and a height, $h_1$.

8. The method of claim 7, wherein each first hollow portion is aligned with a respective second solid portion and each first solid portion is aligned with a respective second hollow portion.

9. The method of claim 7, wherein the second grating is positioned a distance, h, from the first grating, a range of angles of the small angle scattered photons is related to the distance.

10. The method of claim 7, wherein the second grating is positioned a distance, $l_1$, from the first grating and a principal energy angle, $\theta_p$, is equal to $w_1/(h_1+l_1)$.

11. The method of claim 7, wherein the first grating has a first surface, the plurality of first grating cells positioned between a detector and the opposing first surface, and the second grating has a second surface and an opposing third surface, the plurality of second grating cells positioned between the second surface and the opposing third surface, the first surface and the second surface separated by a distance, $l_1$.

12. The method of claim 11, wherein a distance between the detector and the first surface and a distance between the second surface and the third surface corresponds to a height, $h_1$, of the grating cells.

13. An x-ray system comprising:
an x-ray source configured to emit an x-ray beam;
a detector configured to detect one or more small angle scattered photons, the scattering related to an object to be imaged; and
an x-ray small angle scattering apparatus comprising:
a first grating comprising a plurality of first grating cells; and
a complementary second grating comprising a plurality of second grating cells, the second grating positioned relative to the first grating,
a configuration of the first grating, a configuration of the second grating and the relative positioning of the gratings configured to pass one or more small angle scattered photons and to block one or more Compton scattered photons and one or more main x-ray photons;
wherein each first grating cell comprises a first solid portion and an adjacent first hollow portion and each second grating cell comprises a second solid portion and an adjacent second hollow portion, each hollow portion and each solid portion having a width, $w_1$, and a height, $w_1$.

14. The x-ray system of claim 4, wherein each first hollow portion is aligned with a respective second solid portion and each first solid portion is aligned with a respective second hollow portion.

15. The x-ray system of claim 13, wherein the second grating is positioned a distance, $l_1$, from the first grating, a range of angles of the small angle scattered photons is related to the distance.

16. The x-ray system of claim 4, wherein the second grating is positioned a distance, $l_1$, from the first grating and a principal energy angle, $\theta_p$, is equal to $w_1/(h_1+l_1)$.

17. The x-ray system of claim 13, wherein the first grating has a first surface, the plurality of first grating cells positioned between a detector and the opposing first surface, and the second grating has a second surface and an opposing third surface, the plurality of second grating cells positioned between the second surface and the opposing third surface, the first surface and the second surface separated by a distance, $l_1$.

18. The x-ray system of claim 17, wherein a distance between the detector and the first surface and a distance between the second surface and the third surface corresponds to a height, $h_1$, of the grating cells.

* * * * *